J. C. POLLOCK.
QUICK OPENING VALVE.
APPLICATION FILED JULY 24, 1907.
903,606.
Patented Nov. 10, 1908.
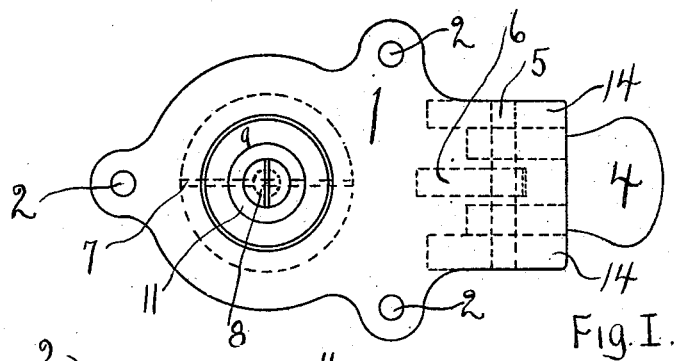
Fig. I.
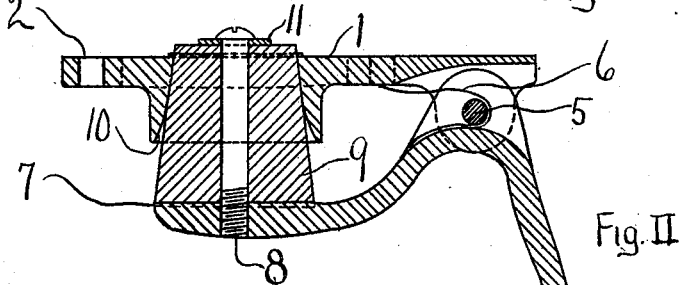
Fig. II.
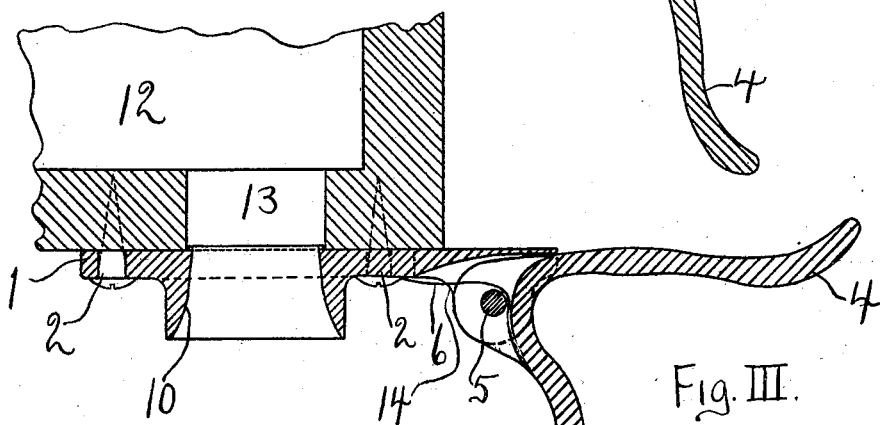
Fig. III.
WITNESSES:
William A. Radtke
Chas. J. Mauritzen
INVENTOR
James C. Pollock
BY
Andrew H. Neureuther
ATTORNEY

UNITED STATES PATENT OFFICE.

JAMES C. POLLOCK, OF CHICAGO, ILLINOIS.

QUICK-OPENING VALVE.

No. 903,606.    Specification of Letters Patent.    Patented Nov. 10, 1908.

Application filed July 24, 1907. Serial No. 385,270.

*To all whom it may concern:*

Be it known that I, JAMES C. POLLOCK, a citizen of the United States, residing in the city of Chicago, county of Cook, and State of Illinois, have invented certain new and useful Improvements in Quick - Opening Valves, of which the following is a specification.

My invention relates to improvements in quick opening valves and has for its object the production of a valve which can be opened and closed very rapidly, and which is simple and inexpensive to make.

A further object of my invention is to provide such a valve having a renewable plug or cork which can be readily expanded to fit its seat, and which can be easily replaced when worn out.

I attain these objects by the means illustrated in the accompanying drawing, in which—

Figure 1 represents a top view of my valve. Fig. 2 represents a vertical cross sectional view of my valve when same is closed. Fig. 3 is a vertical cross sectional view, showing an application of my valve, the valve being open.

Similar numerals refer to similar parts throughout the several views.

In the drawings, 1 represents the frame of the valve which has the holes 2 for fastening it to the vessel 12 as shown in Fig. 3, which may be the tub of a washing machine, which has an aperture 13 in line with the flared aperture or seat 10 in frame 1. Frame 1 also has projections 14 depending from it, which have a pin 5 passing through them as shown. Journaled on this pin 5 is a bell crank lever 4, on one end of which is formed a handle for operating said lever. The other end of said lever 4 has a threaded aperture which carries a bolt 8, which passes through a tapered stopper 9 which is made of cork or some other elastic material. Bolt 8 also carries a washer 11 under its head. I have shown the bolt 8 with a slotted head for drawing it up tight on washer 11 and cork 9. Lever 4 is journaled on pin 5 placed at the proper distance so that the tapered stopper 9 will enter the flared aperture or seat 10 in frame 1, as shown in Fig. 2, the stopper being forced in by means of the handle on lever 4. A spring 6 is placed around pin 5, between frame 1 and lever 4, in such a manner that it tends to keep the valve open as shown in Fig. 3, so that any liquid flowing through the aperture 10 will not strike the stopper 9 and scatter it.

It is evident that the tapered plug or stopper 9 can readily be replaced by a new one, when it becomes badly worn, by means of the said bolt 8. Bolt 8, however, is also used in my invention for the following purpose. When the stopper 9 becomes worn, instead of replacing it immediately, I screw down the bolt 8 which expands the stopper 9 (which is made of elastic material as above mentioned) enlarging it so it is again tight in aperture or seat 10.

It is readily seen that in order to close my valve it is only necessary to strike or push the handle on lever 4 downward, and to open it, strike or push it back again, both of which are simply and very rapidly accomplished. It may be further mentioned that lever 4 has a rib 7 which prevents the stopper 9 from turning thus acting as a lock to maintain the bolt 8 in position.

I claim:

1. In a quick opening valve, a frame, a flared aperture in said frame, a lever journaled on said frame, an elastic stopper mounted on said lever, with means for expanding said stopper and a spring for holding said stopper away from said aperture.

2. In a quick opening valve, a frame having a flared aperture, a lever having a handle formed on one of its ends, journaled on said frame, an elastic stopper mounted on said lever, with means for expanding said stopper and a spring for holding said stopper away from said aperture.

3. In a quick opening valve, a frame having a flared aperture, a lever journaled on said frame, an elastic stopper mounted on said lever, with means for expanding said stopper, said means comprising a bolt, passing through said stopper, having its end threaded into an aperture in said lever.

4. In a quick opening valve, a frame having a flared aperture, a lever journaled on said frame, an elastic stopper mounted on said lever, with means for locking said stopper against rotation, means for expanding said stopper and means for holding said stopper away from said aperture.

5. In a quick opening valve, a frame having a flared aperture, a lever journaled on said frame, an elastic stopper adjustably mounted on said lever, with means for locking said stopper against rotation, said means comprising a ridge formed on said lever, and a spring for holding said stopper away from said aperture.

6. In a quick opening valve, a frame having a flared aperture, a lever journaled on said frame, a handle formed on said lever, an elastic stopper mounted on said lever, with means for expanding said stopper, and locking it against rotation, and a spring for holding said stopper away from said aperture.

JAMES C. POLLOCK.

Witnesses:
CARLO KUEHNE,
HERMAN MINSTERHEIM.